United States Patent
Zaman

(10) Patent No.: US 9,203,257 B1
(45) Date of Patent: Dec. 1, 2015

(54) PORTABLE WIND AND SOLAR POWER GENERATOR

(71) Applicant: Mahmoud Mohammed Zaman, Kuwait (KW)

(72) Inventor: Mahmoud Mohammed Zaman, Kuwait (KW)

( * ) Notice: Subject to any disclaimer, the term of this patent is extended or adjusted under 35 U.S.C. 154(b) by 0 days.

(21) Appl. No.: 14/706,620

(22) Filed: May 7, 2015

(51) Int. Cl.
| | |
|---|---|
| *H02J 7/00* | (2006.01) |
| *H02J 7/14* | (2006.01) |
| *H02J 7/35* | (2006.01) |
| *F03D 9/00* | (2006.01) |

(52) U.S. Cl.
CPC .............. *H02J 7/0068* (2013.01); *H02J 7/0004* (2013.01); *H02J 7/0021* (2013.01); *H02J 7/0027* (2013.01); *H02J 7/1415* (2013.01); *H02J 7/35* (2013.01); *F03D 9/002* (2013.01); *F05B 2240/40* (2013.01); *Y02E 10/725* (2013.01); *Y02E 10/728* (2013.01); *Y02E 10/74* (2013.01)

(58) Field of Classification Search
CPC .. F03D 9/002; F05B 2240/40; F05B 2240/94; Y02E 10/728; Y02E 10/74; Y02E 10/725; H02J 7/0027; H02J 7/1415; H02J 7/35
USPC .................. 136/251, 246, 245, 293; 248/455; 320/101; 126/600, 608, 622, 704
See application file for complete search history.

(56) References Cited

U.S. PATENT DOCUMENTS

| | | | | | |
|---|---|---|---|---|---|
| 4,421,943 | A | * | 12/1983 | Withjack | ............... F24J 2/5264 126/569 |
| 4,842,316 | A | * | 6/1989 | Lerma | ..................... B60P 3/025 296/173 |
| D340,681 | S | * | 10/1993 | Alpiser | ........................ D12/101 |
| 5,542,203 | A | * | 8/1996 | Luoma | .................... G09F 13/04 340/908 |
| 5,969,501 | A | * | 10/1999 | Glidden | ................... F24J 2/523 320/101 |

(Continued)

FOREIGN PATENT DOCUMENTS

| | | |
|---|---|---|
| CN | 203261065 U | 10/2013 |
| DE | 202007013493 U1 | 11/2007 |
| GB | 2451466 A | 2/2009 |

*Primary Examiner* — Rexford Barnie
*Assistant Examiner* — Elim Ortiz
(74) *Attorney, Agent, or Firm* — Richard C. Litman

(57) ABSTRACT

The portable wind and solar power generator is a portable system for charging rechargeable batteries and providing power for external devices from wind and solar energy. The portable wind and solar power generator includes a housing for receiving at least one turbine and at least one electrical generator. At least one solar panel is mounted on the housing. The housing is rotatably mounted on an upper surface of a hollow base which houses at least one rechargeable battery. The at least one rechargeable battery is in electrical communication with the at least one electrical generator and the at least one solar panel for charging thereof. A wind vane mounted on a rear end of the housing causes ambient wind to rotate the housing, with respect to the hollow base, such that the ambient wind impinges upon the at least one turbine to drive the at least one electrical generator.

14 Claims, 5 Drawing Sheets

(56) References Cited

U.S. PATENT DOCUMENTS

| | | | | |
|---|---|---|---|---|
| 6,201,181 B1* | 3/2001 | Azzam | H02S 40/38 | 126/600 |
| 6,396,239 B1* | 5/2002 | Benn | F24J 2/36 | 307/150 |
| 7,230,819 B2* | 6/2007 | Muchow | F03D 9/007 | 307/22 |
| D584,223 S * | 1/2009 | Cooper | D13/102 | |
| 7,772,716 B2* | 8/2010 | Shaver, II | H02H 9/041 | 307/31 |
| 7,795,837 B1* | 9/2010 | Haun | H01M 10/441 | 136/244 |
| 8,295,033 B2* | 10/2012 | Van Straten | F03D 1/005 | 280/400 |
| 8,299,645 B2* | 10/2012 | Muchow | F03D 1/001 | 290/55 |
| 8,593,102 B2* | 11/2013 | McGuire | F03D 1/005 | 136/245 |
| 8,598,724 B2* | 12/2013 | Ulanovskiy | E02D 27/42 | 290/44 |
| 8,854,794 B2* | 10/2014 | Van Straten | H02S 10/10 | 290/44 |
| 8,864,207 B2* | 10/2014 | Hixson | B60P 3/0257 | 296/22 |
| 9,046,281 B2* | 6/2015 | Curran | F24J 2/523 | |
| 2009/0108586 A1* | 4/2009 | Koury | F03D 3/002 | 290/55 |
| 2010/0032955 A1* | 2/2010 | Chen | F03D 11/04 | 290/55 |
| 2010/0207452 A1* | 8/2010 | Saab | F03D 1/005 | 307/65 |
| 2014/0028242 A1* | 1/2014 | Akin et al. | 320/101 | |
| 2014/0105729 A1* | 4/2014 | Tarbox | F03D 11/04 | 415/122.1 |
| 2014/0285005 A1* | 9/2014 | Casteel | H02S 10/40 | 307/23 |

* cited by examiner

PORTABLE WIND AND SOLAR POWER GENERATOR

BACKGROUND OF THE INVENTION

1. Field of the Invention

The present invention relates generally to power generation, and particularly to a portable generator for generating electrical energy from wind and solar energy.

2. Description of the Related Art

Due to the costs and environmental concerns related to the burning of fossil fuels, alternative power generation systems are of great interest, particularly in the form of power generators based on inexhaustible resources, such as ambient wind and solar energy. Although a wide variety of solar energy systems have been developed, harnessing wind power effectively has been problematic. Due to the nature of the weather in general, wind can come from any direction, thus static wind-driven turbines are often facing in the wrong direction to make full use of the wind's power. Further, such systems tend to be very large scale and are extremely difficult to transport to new locations. Thus, a portable wind and solar power generator solving the aforementioned problems is desired.

SUMMARY OF THE INVENTION

The portable wind and solar power generator is a portable system for charging rechargeable batteries and providing power for external devices from wind and solar energy. The portable wind and solar power generator includes a housing for receiving at least one turbine and at least one electrical generator linked to the at least one turbine such that the at least one turbine can be driven to rotate by ambient wind, thus driving the at least one electrical generator to generate electrical power. Further, at least one solar panel is mounted on an exterior of the housing. The housing is rotatably mounted on an upper surface of a hollow base which houses at least one rechargeable battery. The at least one rechargeable battery is in electrical communication with the at least one electrical generator and the at least one solar panel for charging thereof. A wind vane is further mounted on a rear end of the housing. The wind vane causes ambient wind to rotate the housing, with respect to the hollow base, such that the ambient wind impinges upon the at least one turbine to drive the at least one electrical generator.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
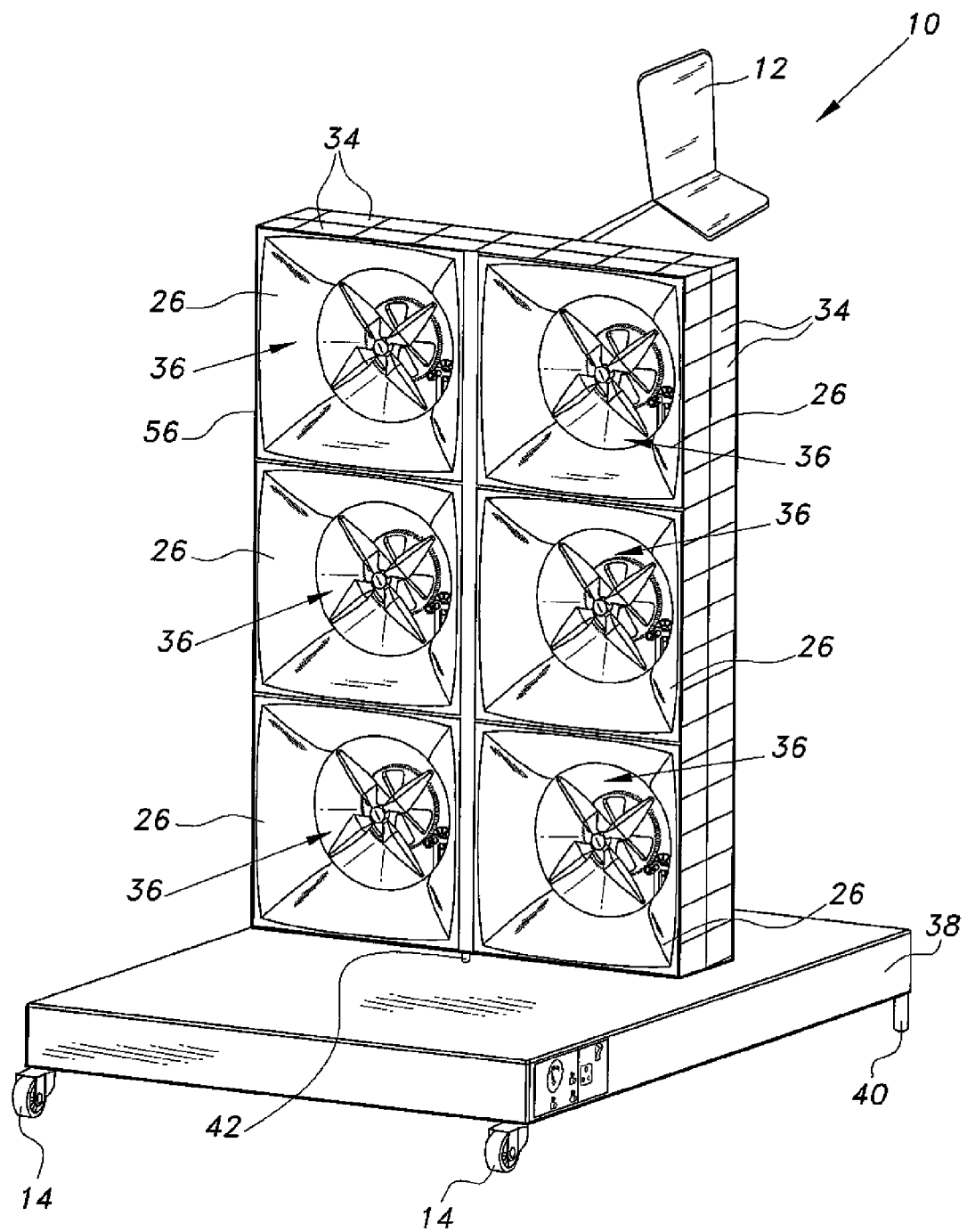
FIG. 1 is a front perspective view of a portable wind and solar power generator according to the present invention.
Figure 2:
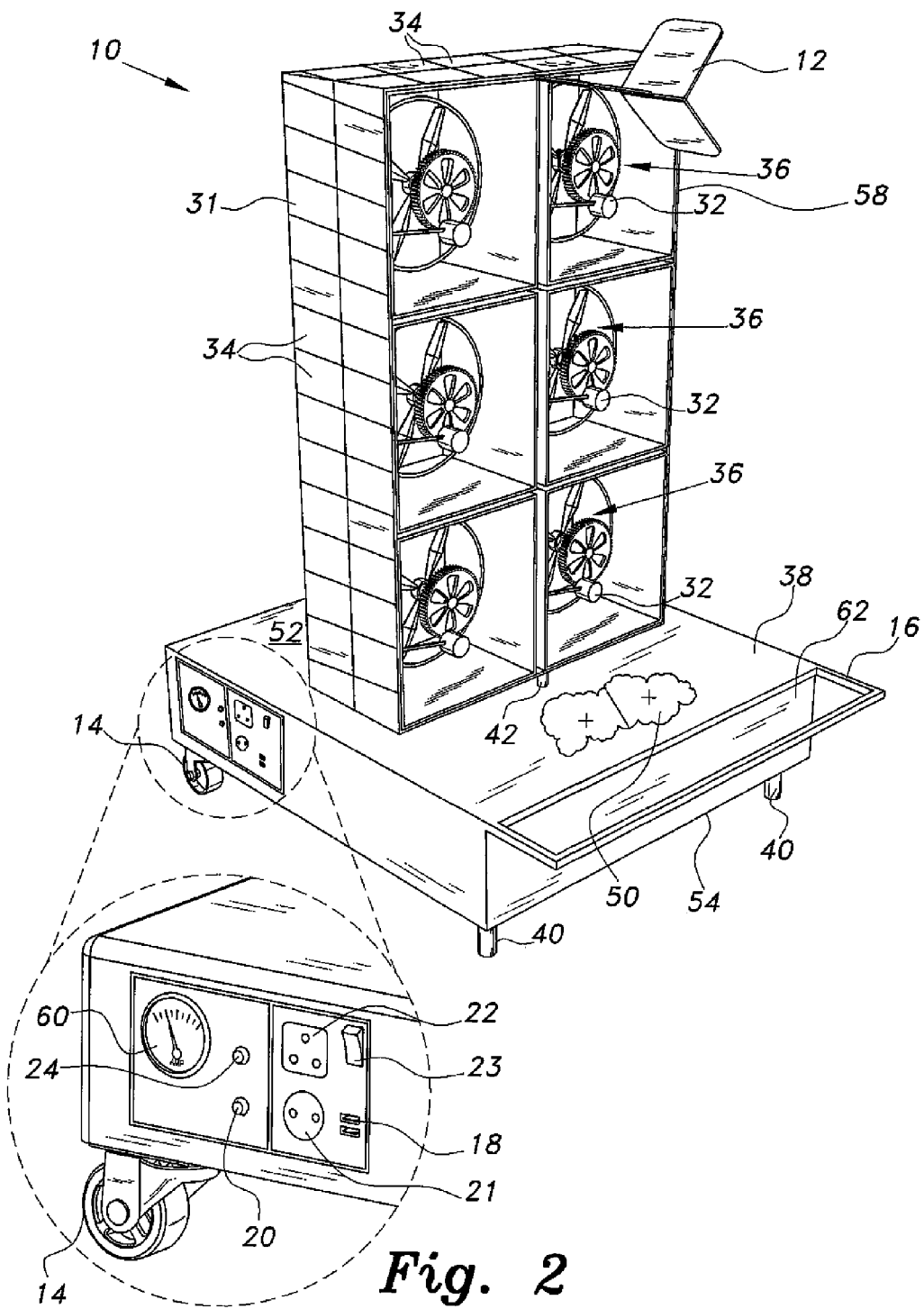
FIG. 2 is a rear perspective view of the portable wind and solar power generator according to the present invention.

Referring now to FIGS. 1 and 2, there is shown a portable wind and solar power generator 10, which is a portable system for charging rechargeable batteries and providing power for external devices from wind and solar energy. The portable wind and solar power generator 10 includes a housing 31 for receiving at least one turbine 36 and at least one electrical generator 32 linked to the at least one turbine 36 such that the at least one turbine 36 can be driven to rotate by ambient wind, thus driving the at least one electrical generator 32 to generate electrical power. In FIGS. 1 and 2, six such turbines 36 are shown arrayed within a rectangular housing 31, with the turbines 36 being arrayed in two vertical columns of three turbines. It should be understood that this arrangement is shown for exemplary purposes only. Any desired number of turbines may be arrayed in any suitable configuration within housing 31. Additionally, housing 31 may have any suitable contouring and relative dimensions, and it should be understood that the number of turbines 36, their arrangement, and the overall configuration of housing 31 are shown for exemplary purposes only.

As shown, a front funneling frame 26 may be provided adjacent a front end of each of turbines 36 (and adjacent a front end 56 of housing 31) for funneling ambient wind thereto. It should be understood that the contouring and relative dimensions of front funneling frames 26 are shown in FIG. 1 for exemplary purposes only. Additionally, as shown, at least one solar panel 34 is mounted on an exterior of the housing 31. In FIG. 1, the entire exterior frame of housing 31 is shown covered with solar panels 34. It should be understood that the number, type and arrangement of solar panels 34 is dependent upon the particular needs and desires of the user.

Figure 5:
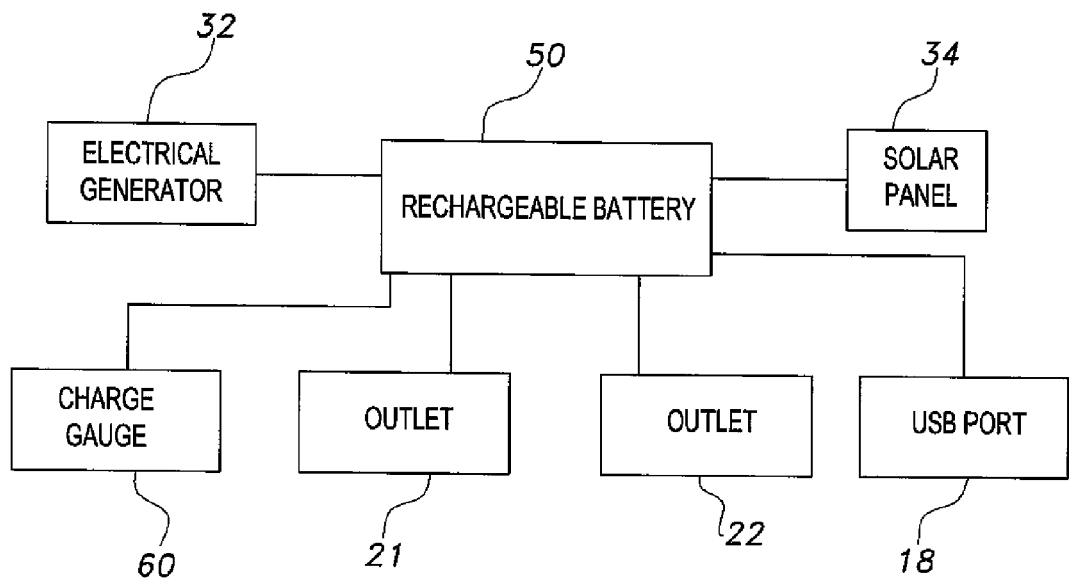
FIG. 5 is a block diagram showing electrical interconnection of the electrical components of the portable wind and solar power generator.

The housing 31 is rotatably mounted, by a rotating support 42, on an upper surface 52 of a hollow base 38. It should be understood that any suitable type of rotatable mounting or pivot may be used for the rotation of rotating support 42. The hollow base 38, as shown in partial cut-away in FIG. 2, houses at least one rechargeable battery 50. It should be understood that any suitable number and type of rechargeable batteries 50 may be contained within hollow base 38. As shown in FIG. 5, the at least one rechargeable battery 50 is in electrical communication with the at least one electrical generator 32 and the at least one solar panel 34 for charging thereof. Returning to FIGS. 1 and 2, a wind vane 12 is further mounted on a rear end 58 of the housing 31. The wind vane 12 causes ambient wind to rotate the housing 31, with respect to the hollow base 38 via rotating support 42, such that the ambient wind impinges upon the at least one turbine 36 to drive the at least one electrical generator 32.

Figure 3:
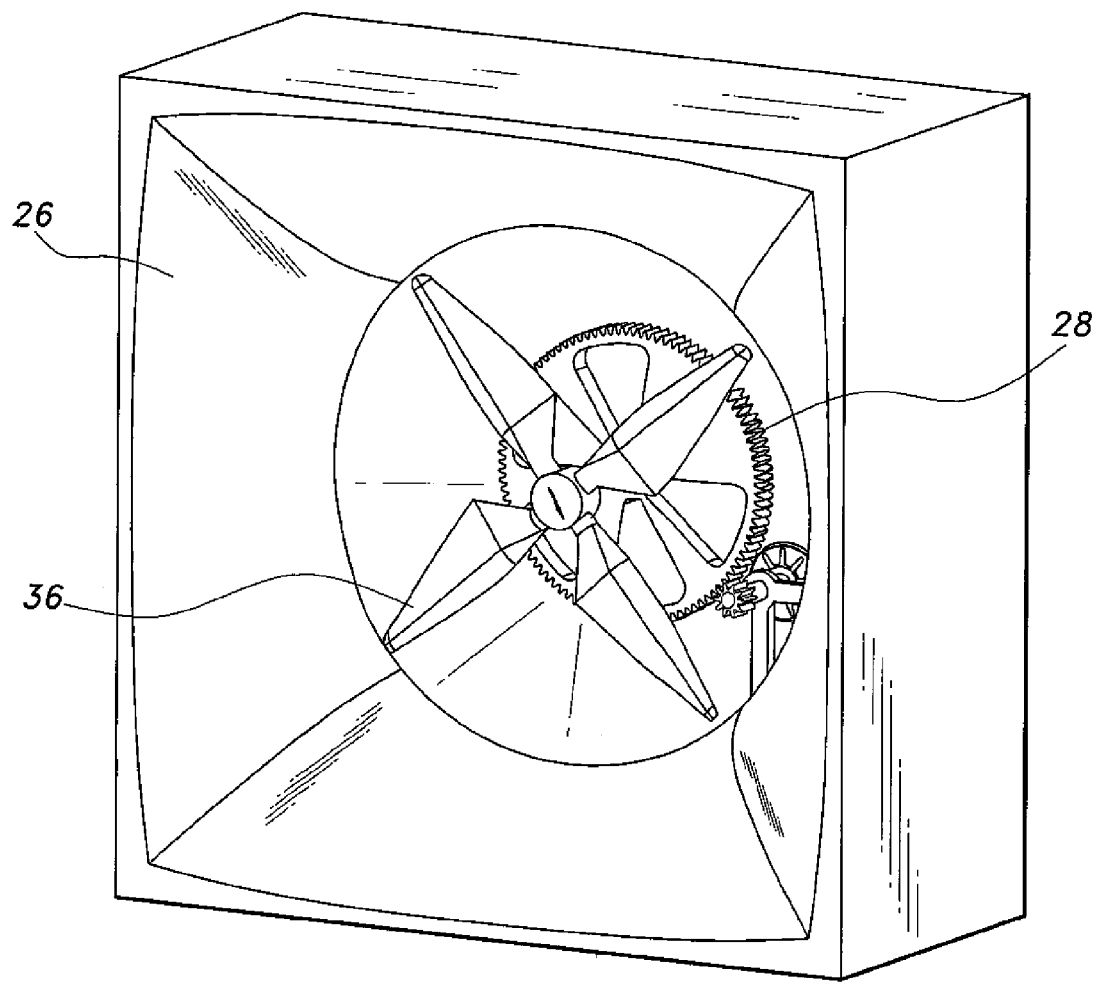
FIG. 3 is a front perspective view of a single turbine module used in the portable wind and solar power generator.
Figure 4:
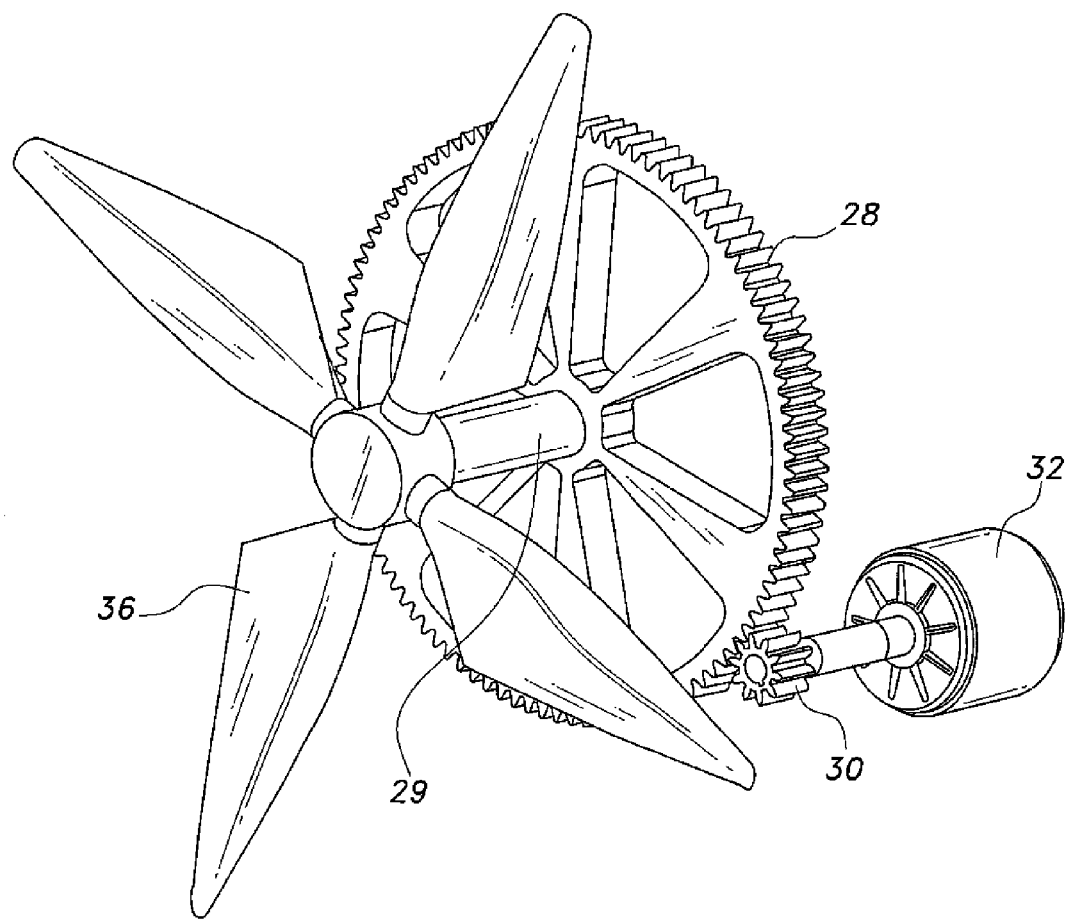
FIG. 4 is a perspective view showing the mechanical interconnection of one of the turbines of the portable wind and solar power generator with a corresponding electrical generator.

As shown in FIGS. 3 and 4, each turbine 36 is mounted on an axle 29, which is fixed to a corresponding gear 28. Each gear 28 engages a corresponding gear 30, which drives the electrical generator 32. It should be understood that any suitable type of electrical generator and any suitable type of gear arrangement or linkage may be utilized for the driving of the electrical generator 32.

Additionally, a pair of static supports 40 and a pair of wheels 14 are preferably mounted to rear and front ends, respectively, of a lower surface 54 of the hollow base 38. A handle 16 is preferably mounted on a rear end 62 of the hollow base 38, allowing the user to easily lift the rear end 62 and transport the portable wind and solar power generator 10 via wheels 14.

Further, as best shown in FIGS. 2 and 5, a charge gauge 60 is preferably mounted on the hollow base 38 for showing a charge status of the at least one rechargeable battery 50. Further, electrical outlets 21, 22 are preferably in electrical communication with the at least one rechargeable battery 50, allowing the user to connect an external device thereto. It should be understood that electrical outlets 21, 22 are shown for exemplary purposes only, and any desired number and type of electrical outlets may be provided. As shown, a universal serial bus (USB) port 18 may also be provided for providing power to portable devices. Power may be provided to external devices selectively by an on-off switch, such as switch 23, or the like. Additionally, one or more indicators, such as exemplary lights 20, 24, may be provided to indicate to the user that power is being delivered directly from the electrical generators 32 and/or the solar panels 34, or from the rechargeable batteries 50. It should be understood that an AC/DC power converter may be provided, in communication with the rechargeable batteries 50 and the outlets 21, 22, as is well known in the art.

It is to be understood that the present invention is not limited to the embodiments described above, but encompasses any and all embodiments within the scope of the following claims.

I claim:

1. A portable generator for converting wind energy and solar power energy into electrical power, the portable generator consisting of:
   a plurality of turbines;
   a housing designed and configured for operatively supporting the plurality of turbines;
   the plurality of turbines modularly arrayed within the housing;
   a plurality of electrical generators received within the housing and respectively being driven by the plurality of turbines;
   a plurality of front funneling frames, each one of the plurality of front funneling frames positioned adjacent a corresponding and respective front of each one of the plurality of turbines for funneling the wind energy through each corresponding turbine;
   at least one solar panel mounted on an exterior of the housing for receiving the solar power energy and producing electrical potential;
   a base having a hollow interior, wherein the housing is rotatably mounted in a vertically stacked arrangement on an upper surface of the base;
   a pair of static supports mounted on a lower surface of the hollow base at a first end;
   a pair of wheels mounted on a lower surface of the hollow base at a second end opposite the first end;
   at least one rechargeable battery received within the hollow interior of the base, the plurality of electrical generators and the at least one solar panel being in electrical communication with the at least one rechargeable battery for charging thereof;
   a wind vane mounted on a rear end of the housing, whereby the wind vane causes ambient wind to rotate the housing such that the ambient wind impinges upon the at least one turbine to drive the at least one electrical generator;
   a plurality of electrical connectors mounted on the base;
   wherein the plurality of electrical connectors are in electrical communication with the at least one rechargeable battery;
   the electrical connectors selected from the group consisting of AC outlets, DC outlets, universal serial bus ports;
   a switch for selectively providing power to the plurality of electrical connectors;
   a plurality of indicators, each of the plurality of indicators operatively connected for indicating one of a plurality of conditions;
   the plurality of conditions including a charge level of each of the at least one rechargeable battery, the power delivered from the at least one solar panel, the power delivered from the plurality of generators, and the power delivered from any combination thereof; and
   a converter coupled between at least one electrical connector and the at least one rechargeable battery, the converter converting the DC potential of the rechargeable battery into an AC power output at the at least one electrical connector.

2. A portable power generator utilizing wind energy and solar energy in combination, comprising:
   a housing consisting of:
      at least one turbine received within the housing;
      at least one electrical generator received within the housing and being driven by the at least one turbine;
      a wind vane mounted on a rear end of the housing;
      wherein the wind vane maintains the housing in alignment with the direction of any wind energy for maximizing efficiency; and
      at least one solar panel mounted on an exterior of the housing;
   a base having at least an upper surface, a lower surface, and a hollow interior;
   wherein the housing disposed on the upper surface of the base, the housing is selectively rotatable about a support on the upper surface;
   a pair of static supports mounted on a rear portion of a lower surface of the hollow base;
   a pair of wheels mounted on a front portion of a lower surface of the hollow base and
   at least one rechargeable battery received within the hollow interior of the base, the at least one electrical generator and the at least one solar panel being in electrical communication with the at least one rechargeable battery for charging thereof;
   wherein the wind vane causes ambient wind to rotate the housing such that the ambient wind impinges upon the at least one turbine to drive the at least one electrical generator.

3. The portable wind and solar power generator as recited in claim 2, further comprising a charge gauge mounted on the hollow base and being in electrical communication with the at least one rechargeable battery for visually indicating a charge status thereof.

4. The portable wind and solar power generator as recited in claim 2, further comprising at least one electrical outlet mounted on the hollow base and being in electrical communication with the at least one rechargeable battery.

5. The portable wind and solar power generator as recited in claim 2, further comprising at least one universal serial bus port mounted on the hollow base and being in electrical communication with the at least one rechargeable battery.

6. The portable wind and solar power generator as recited in claim 2, further comprising a handle mounted on a rear end of the hollow base.

7. A portable wind and solar power generator, comprising:
   a base, and
   a housing selectively rotatable on the base;

the housing consisting of:
- a plurality of turbines arrayed within the housing;
- a plurality of front funneling frames positioned adjacent to a respective front end of each one of the plurality of turbines for funneling the wind thereto;
- a plurality of electrical generators received within the housing, each electrical generator respectively driven by a corresponding one of the plurality of turbines;
- a wind vane disposed on the housing;
- at least one solar panel mounted on an exterior of the housing; and
- electrical wiring connectors corresponding associate with each of the electrical generators and the at least one solar panel for establishing electrical connections external to the housing;

the base including at least an upper surface, a lower surface, and a hollow interior,
- a support disposed on the upper surface for rotatably supporting the housing on the upper surface of the base;
- at least one rechargeable battery received within the hollow interior of the base; and
- electrical couplings connecting the electrical connections external to the housing to the at least one rechargeable battery;
- wherein the wind vane causes ambient wind to rotate the housing such that the ambient wind impinges upon the at least one turbine to drive the at least one electrical generator.

8. The portable wind and solar power generator as recited in claim 7, further comprising a plurality of electrical connectors mounted on the base;
- the plurality of electrical connectors selected from the group consisting of AC outlets, DC outlets, universal serial bus ports;
- wherein the plurality of electrical connectors are in electrical communication with the at least one rechargeable battery;
- a switch for selectively providing power to the plurality of electrical connectors;
- a plurality of indicators, each of the plurality of indicators operatively connected for indicating one of a plurality of conditions;
- the plurality of conditions including a charge level of each of the at least one rechargeable battery, the power delivered from the at least one solar panel, the power delivered from the plurality of generators, and the power delivered from any combination thereof; and
- a converter coupled between at least one electrical connector and the at least one rechargeable battery, the converter converting the DC potential of the rechargeable battery into an AC power output at the at least one electrical connector.

9. The portable wind and solar power generator as recited in claim 7, a pair of static supports mounted on a rear portion of a lower surface of the hollow base.

10. The portable wind and solar power generator as recited in claim 9, further comprising a pair of wheels mounted on a front portion of a lower surface of the hollow base.

11. The portable wind and solar power generator as recited in claim 7, further comprising a charge gauge mounted on the base and being in electrical communication with the at least one rechargeable battery for visually indicating a charge status thereof.

12. The portable wind and solar power generator as recited in claim 7, further comprising at least one electrical outlet mounted on the base and being in electrical communication with the at least one rechargeable battery.

13. The portable wind and solar power generator as recited in claim 7, further comprising at least one universal serial bus port mounted on the base and being in electrical communication with the at least one rechargeable battery.

14. The portable wind and solar power generator as recited in claim 7, further comprising a handle mounted on an end of the base.

* * * * *